July 3, 1934.  C. BROWN  1,965,452

ROOF FOR VEHICLES AND THE LIKE

Filed Oct. 5, 1929

INVENTOR
CARLETON BROWN

BY *Fetherstonhaugh & Co.*
ATTORNEYS

Patented July 3, 1934

1,965,452

UNITED STATES PATENT OFFICE 1,965,452

ROOF FOR VEHICLES AND THE LIKE

Carleton Brown, Westmount, Quebec, Canada

Application October 5, 1929, Serial No. 397,617

3 Claims. (Cl. 296—137)

This invention relates to new and useful improvements in roofs and particularly to roofs for expansible bodies and the object of the invention is to provide a sectional roof so connected to the body that the headroom within the body may be considerably increased.

Another object is to provide a roof for expansible vehicle bodies which may be quickly and easily adjusted so that when the roof sections are connected together by a closing member, rain may be quickly shed therefrom.

According to my invention I provide a vehicle body built in sections, preferably two. These sections are so mounted on the chassis of the vehicle that they may be moved toward or away from one another to increase the floor area. Each section or half body consists of a wall, ends, floor and roof, and is preferably made in accordance with my co-pending application, Serial No. 379,794.

My improvement lies in the roof attachment to the sides. The roof is attached to the side by hinges so that it can be raised to give increased headroom within and between the sections when the vehicle is in the expanded condition. When in the closed or portable condition the roof sections are bolted together or sealed and are so shaped that the rain is quickly and easily shed therefrom.

In the drawing which illustrates my invention:

Figure 1:
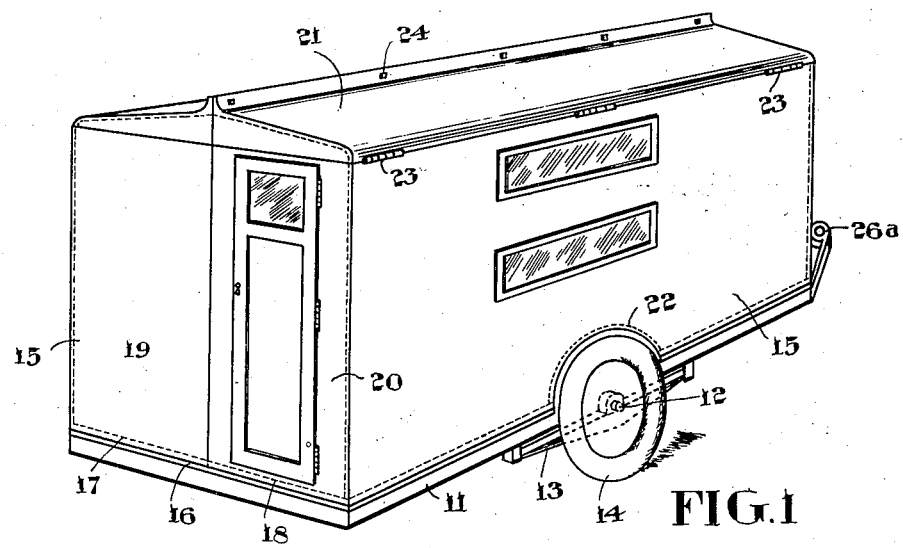
Figure 1 is a perspective view of a portable vehicle with my improved roof attached thereto.

Referring more particularly to the drawing 11 designates a chassis of the trailer type which is mounted above the axle 12 and resiliently connected thereto by the springs 13. Wheels 14 are rotatably mounted on the axle. Slidably mounted above the chassis are the body sections, 15 preferably two, which in the illustration are shown as movable toward and away from one another in the transverse direction of the vehicle. The chassis is preferably provided with a floor 16. Each body section is provided with floor 17, side 18 ends 19 and 20 and a roof 21. Wells 22 are formed in each side and floor to clear the wheels when the body sections are expanded to the position shown in Figure 2.

Figure 2:
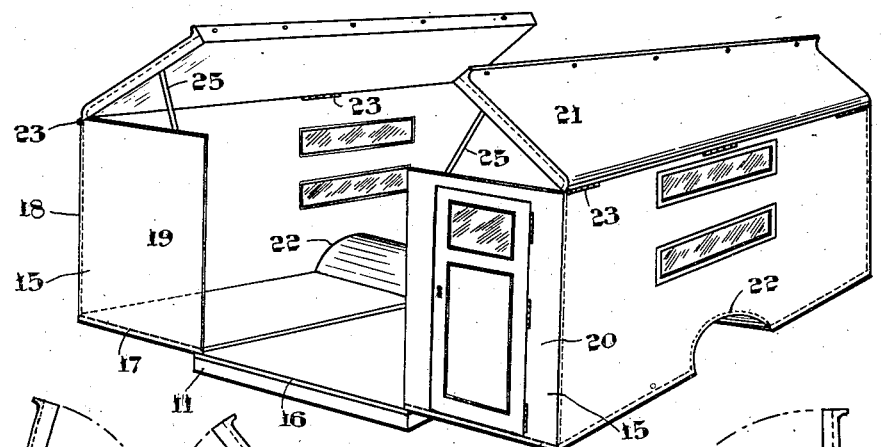
Figure 2 is a perspective view of the same vehicle as shown in Figure 1 with the roof section raised to increase the headroom.
Figures 3, 4:
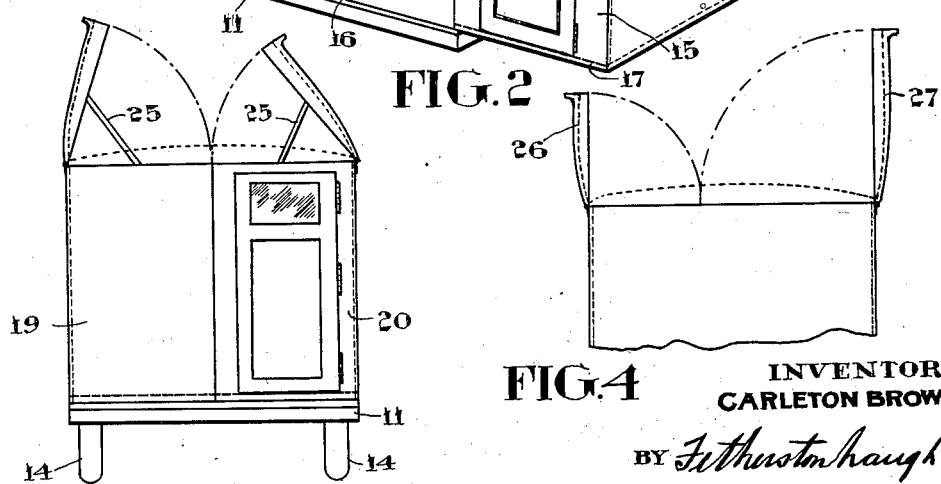
Figure 3 is an end view of the vehicle with the body sections in their closed position and the roof sections raised or opened.
Figure 4 is a partial end view of one modification which may be made to the roof construction.

My improvement lies in the roof. Each roof section is attached to the adjacent side by hinges 23 which allow the said roof sections to be raised to any desired angle. My preferred form of roof section is shown in Figures 1 to 3 inclusive. These roof sections are each preferably exactly similar in shape and are preferably made of ogee or reverse curve form with the free ends at a greater elevation at all times than at the sides. The sections when made in this form meet on the longitudinal centre line of the vehicle as shown in Figure 1. This is the preferred position of the roof sections when the vehicle is in its mobile state. Bolts 24 or like fastening means may be used for clamping the abutting edges of the roof sections together to make same weather-proof. If desired the roof sections may be opened as shown in Figure 3 while the vehicle is in transportion. In Figure 2 I have shown the half bodies of the vehicle opened to provide increased living quarters and, to provide increased headroom, it will be seen that the roof sections have been hinged upwardly. When the sections are of equal width it is advisable to make the angle contained by one roof section and the end greater on one side than the angle contained between the other roof section and its adjacent end. The reason for this is that when a tarpaulin or like closing member is stretched between the peaks of the roof sections said member will lie at an angle to the horizontal to cause the rain to flow towards the low side. The roof sections may be supported by any suitable means at the desired angle and in Figure 2 for illustrative purposes, I have shown bars 25, the ends of each of which fit into recesses or holes not shown in the ends and in the underside of the roof sections. In Figure 4 the roof sections 26 and 27 are made of different widths.

When the vehicle is being transported from one place to another it is in the condition shown in Figure 1 that is with the two sections bolted or otherwise secured to one another. If it is desired to use the vehicle during transportation the roof sections may be opened as shown in Figure 3. The vehicle in this mobile condition is equal in width to an automobile proper and may be attached thereto by any suitable connecting means such as the link 26a. When it is desired to do so, the vehicle sections may be spread apart and the roof raised and the opening between the roof peaks closed to provide ample living room and headroom. The vehicle is usually expanded when it is parked at any desired site.

In the drawing I have shown the roof attached to a split body trailer, the split being in the longitudinal direction of the vehicle but it will be readily understood that the roof and body may be split transversely of the vehicle without departing from the spirit of the invention. The vehicle is shown as an unpowered trailer adapted for coupling to a source of locomotion but the body and roof may be equally applied to a powered vehicle having two or more wheels.

Having thus described my invention, what I claim is:—

1. A vehicle including a chassis equipped with a floor, an expansible body superposed on said floor, said body being split longitudinally from end to end to provide independently movable half sections normally arranged with the inner edges thereof abutting along the central longitudinal axis of the chassis, said sections being outwardly movable on the chassis floor for expansion purposes and being each equipped with a floor, end walls, an outer side wall, and a roof element, said roof element being hingedly connected to the upper edge of the side wall.

2. An expansible vehicle comprising a chassis equipped with a floor, a non-telescopic body construction complete in itself independently of the chassis mounted upon said floor, said body structure consisting solely of two complete half sections normally arranged on the chassis floor with their inner edges abutting along the longitudinal axis of the chassis, each of said half sections having its own floor, end walls, outer side wall, and roof element, said roof element being hinged to the upper edge of the side wall and being vertically movable to increase the head room irrespective whether said body structure is in its contracted or expanded state.

3. A vehicle including a chassis equipped with a floor, an expansible body mounted on said floor, said body being split longitudinally to provide two half sections each of which is equipped with a floor, end walls, an outer side wall and a roof element, said roof element having its outer edge hingedly connected to the upper edge of the side wall, said half sections being normally arranged with the inner edges thereof abutting along the central longitudinal axis of the chassis, the abutting edges of the roof elements of the two sections being detachably secured together to retain the sections in their abutting relation, said roof elements being free, on release of the securing means, to swing upwardly to increase the headroom irrespective of the position of the body sections and said body sections being free to move outwardly with respect to one another upon releasement of said securing means and means for supporting said body sections in their outwardly moved position.

CARLETON BROWN.